United States Patent [19]

O'Malley et al.

[11] Patent Number: 4,996,707
[45] Date of Patent: Feb. 26, 1991

[54] TEXT-TO-SPEECH CONVERTER OF A FACSIMILE GRAPHIC IMAGE

[75] Inventors: Sara O'Malley, New York, N.Y.; Michael H. O'Malley; Elisabeth Peters, both of Berkeley, Calif.

[73] Assignee: Berkeley Speech Technologies, Inc., Berkeley, Calif.

[21] Appl. No.: 308,792

[22] Filed: Feb. 9, 1989

[51] Int. Cl.⁵ .......................................... H04M 11/00
[52] U.S. Cl. ...................................... 379/100; 381/52
[58] Field of Search ......................... 379/100, 94, 214; 381/41, 43, 44, 52; 358/476, 474

[56] References Cited

U.S. PATENT DOCUMENTS

| | | |
|---|---|---|
| 4,427,848 | 1/1984 | Tsakanikas . |
| 4,659,877 | 4/1987 | Dorsey . |
| 4,677,660 | 6/1987 | Yoshida .............................. 379/100 |
| 4,685,135 | 8/1987 | Lin et al. ............................ 381/52 |
| 4,716,583 | 12/1987 | Groner et al. ...................... 379/94 |
| 4,759,053 | 7/1988 | Satomi et al. ...................... 379/100 |
| 4,805,207 | 2/1989 | McNutt et al. ..................... 381/52 |
| 4,812,918 | 3/1989 | Carbone ............................. 358/476 |
| 4,815,121 | 3/1989 | Yoshida .............................. 379/100 |
| 4,816,911 | 3/1989 | Kirsch et al. ....................... 379/100 |

FOREIGN PATENT DOCUMENTS 0000855 1/1989 Japan ................................... 379/100

OTHER PUBLICATIONS

Songco, Allen, Plexico & Morford, *IEEE Spectrum*, May 1980, "How computer Talk to the Blind."
Blazie, *Proceedings, John Hopkins . . . Personal Computing to Aid the Handicapped*, 1981, "Total Talk A Computer Terminal for the Blind."
*Voice News*, vol. 8, No. 7, Jul. 1988.
*GammaFax CP*, Undated brochure explaining a PC mounted Fax board.
Read Right TM OCR System brochure with 1987 copyright; Undated brochure explaining PC software for converting graphic images to coded characters.
'Malley, Larkin and Peters; *Beyond the "Reading Machine": Combining Smart Text-to -Speech with an AI--Based Dialogue Generator;* Sep./Oct. 1986 Speech Technology, Explains Text-to-Speech in relation to a dialogue generator.

*Primary Examiner*—Jin F. Ng
*Assistant Examiner*—Stella L. Woo
*Attorney, Agent, or Firm*—Phillips, Moore, Lempio & Finley

[57] ABSTRACT

A computer system is described that includes a capability to receive and store graphic images from remote facsimile machines. The system includes a software that can convert graphic images of textual material into an ASCII coded file so that either keywords or the coverted text may be converted to speech giving the addressee-user the ability to review incoming facsimiles from a remote telephone. The system includes a relay capability, the capability to print on command and to originate facsimiles either from text files or scanned papers.

28 Claims, 10 Drawing Sheets

TEXT-TO-SPEECH CONVERTER OF A FACSIMILE GRAPHIC IMAGE

TECHNICAL FIELD

This invention relates to the conversion of a graphic image received by a facsimile machine into spoken words. In particular, it relates to a computerized system that receives and converts graphic images into coded characters which in turn are converted into spoken words.

BACKGROUND OF THE INVENTION

The communications field in recent years has seen development and widespread usage of facsimile machines for rapid and simple transmission of printed documents. In fact, the facsimile machine has, for the most part, replaced telegraph or cable communications so common in years past. Simply, this has occurred because of a major increase in speed of transmission of graphic images over telephone circuitry, and secondly a drop in cost in the machine necessary to undertake conversion of a printed document into a graphic image. The term "telephone circuitry" as used herein is meant to include transmission facilities using wires, fiber optic, wireless or satellite communication for signals from one location to another whether public or private.

Concurrently, computer technology has made vast strides in that some form of a computer is the rule rather than the exception even in the smallest of business firms. With the introduction of the computer, there has been advent of communication between computer terminals. By this, it is meant that textual material stored in one computer system in coded characters can now be transmitted over telephone circuitry to a second computer for manipulation in the second computer. Unfortunately the compatibility, of the two computers in this form of communication is critical. Such simple matters as to the coding scheme of the characters (e.g. of eight data bits or seven data bits per character, the presence of parity or not) the transmission and receiving rate (e.g. 300 1200, 2400 bits per second) and the like are critical and thus determine compatibility of communications between computers. Unfortunately, there is no standard for communication between computers.

To the contrary, the facsimile community has recognized the need for compatibility, so that communications between facsimile machines and for that matter between facsimile machines located in different countries presents practically no problems.

Fundamentally there exists a difference between data transmitted from a facsimile machine which is in graphic form and data transmitted between computers which is in a character coded format. Facsimile transmission usually starts with a page of material that may include pictures or graphics in addition to text. The document is scanned by the machine across the width of the page to determine the presence or absence of an image be it a character or a graphic. The scan in a normal page of text consists of 1,728 individual "looks" or pixels across each 8¼ (21.7 cm) line with 1,056 lines per page (a page being 11 inches long or 28 cm. Each pixel may be represented by a 0 or a 1 in a binary format, 0 indicating no image, 1 indicating the presence of an image. In addition, there are coding schemes to reduce the number of pixels transmitted over the telephone line thereby reducing the time taken to send the document. For example, large areas of no textual matter or graphic may be skipped by such a coding scheme. Nevertheless the information gathered by a facsimile machine is eventually represented by a series of ones or zeroes indicating the presence or absence of an image in a rather small area (for example: 0.005 inches wide by 0.01 inches high—0.13 mm×26 mm-in the normal scan).

Data, on the other hand, ordinarily is stored in the computer environment by coded characters, the most common code being the ASCII character set (American Standard Code for Information Interchange), which consists of a seven bit code permitting 128 different characters. This seven bit ASCII code with the addition of one bit has an extended set thereby providing for 256 distinct characters. (There exist other coding schemes for the Roman alphabet and also somewhat more complex coding schemes for the longer alphabets and even more complex coding schemes for ideographic languages.)

In short, the graphic image of a character as determined by a facsimile machine may, for example consist of a matrix of approximately 10×10 pixels or 100 individual bits per typewritten character. Whereas the corresponding ASCII code for that character would be either 7 or 8 bits depending upon the coding structure utilized.

There exists at the present time technology to convert textual matter stored in ASCII or equivalent coded characters into speech. Of course it is understood that the coded characters are arranged in groups to form words and the words in turn are arranged in sentences. (It should also be understood that this discussion, while addressing the English language in the text-to-speech environment, is equally applicable to languages using either an alphabetic system or an ideographic system such as one of the oriental languages.) Thus, if textual matter is stored in a computer in a coded character set, it is possible to convert that text to the spoken word for transmission over telephone circuitry to a remote site.

The term text-to-speech as used in this invention in relation to conversion, includes the conversion to strings of recognizable words into spoken words by means of a "look-up" table of prerecorded words such that the recorded spoken words when assembled can be transmitted to a human listener. The term text-to-speech preferably includes the more fundamental and more flexible procedure of converting strings of individual letters into spoken words through the use of phonemes, where an individual phoneme represents a sound associated with a portion of a letter, a letter or more than one letter, all taken in context with other letters of the same word and in context with a group of words. Text-to-speech, for example, in the first instance would record all the English words using "ough" such as "tough" or "through" or "though." Whereas in the second instance, the sounds associated with the phonemes for the letters o, u, gh and th, would be combined properly to construct the words. Where appropriate the first text-to-speech conversion will be referred to as recorded speech while the phoneme approach will be referred to as synthetic speech. Where either method is appropriate or a combination is used, the term text-to-speech will be used. It is to be understood that the term text-to-speech is meant to include all methods of non human computerized conversion of written words into human sounds that recognizably convey the words to a listener.

There also exists, at the present time, a capability of converting a graphic image either received from a facsimile machine or from a scanner into coded character sets with the fair degree of accuracy. This first came about in what was called the optical character reader or OCR. Originally, OCR machines were limited to special character fonts. More recently, OCR machines have been developed to read most common fonts (e.g. courier). One of the most recent advances is a software package, available from OCR Systems, Inc. of Bensalem, Pa. sold as ReadRight that can convert scanned text in graphic format to ASCII coded characters.

One of the principal advantages of facsimile technology is almost instantaneous transmission and reception of important information. However, if the intended user of the information is not present at the location of the facsimile receiver, this benefit is lost. The principal problem this invention solves is how to give users remote access to facsimile information in a timely way without the need of reproducing the visual image in the facsimile transmission.

An additional benefit is permitting the remote user to control the eventual disposition of the information in the facsimile message. Without knowledge of addressee, the subject, or the source of a facsimile transmission, it is not possible to make intelligent decisions about how the document should be handled. When the user of this invention has received this kind of information in spoken form, he or she can decide how important it is, whether it should be relayed to another machine, or whether it should be held in memory without being printed to preserve its confidentiality or whether some other disposition should be taken. The invention permits the remote user to effect the desired disposition of the facsimile message utilizing touchtone commands from a remote telephone.

It is an object of this invention to combine the facsimile reception capability with the graphic-image-to-coded-character-set capability and then the conversion of coded character textual matter into the spoken word for retransmission over telephone circuitry.

It is a further object of this invention to add an inquiry capability to the aforesaid combination so that a remote user can inquire as to the status of facsimile messages.

It is still a further object of this invention to include with the facsimile reception and conversion system, a management capability so that incoming facsimile messages may be properly routed to the interested user.

It is still a further object of this invention to include options for the disposition of incoming facsimile messages.

These and other objects of the invention will become more apparent in the ensuing description of the preferred embodiment.

SUMMARY OF THE INVENTION

This invention is for a device that converts a series of graphic images of textual material represented by a set of pixels, where each pixel may itself be represented in a binary code, into ASCII coded files of textual material, with the ASCII coded textual material eventually being converted into spoken words. The device consists of a computer for manipulating strings of data, and storage devices for storing a series of graphic images in binary form where at least some of the graphic images represent written words. The device includes software for recognizing, assembling and processing at least portions of the stored series of graphic images into coded characters, with each character capable of being manipulated by the computer. Finally, the device includes a text-to-speech convertor for converting groups of coded characters into spoken words.

DETAILED AND DESCRIPTION OF THE PREFERRED EMBODIMENT

Figure 8:
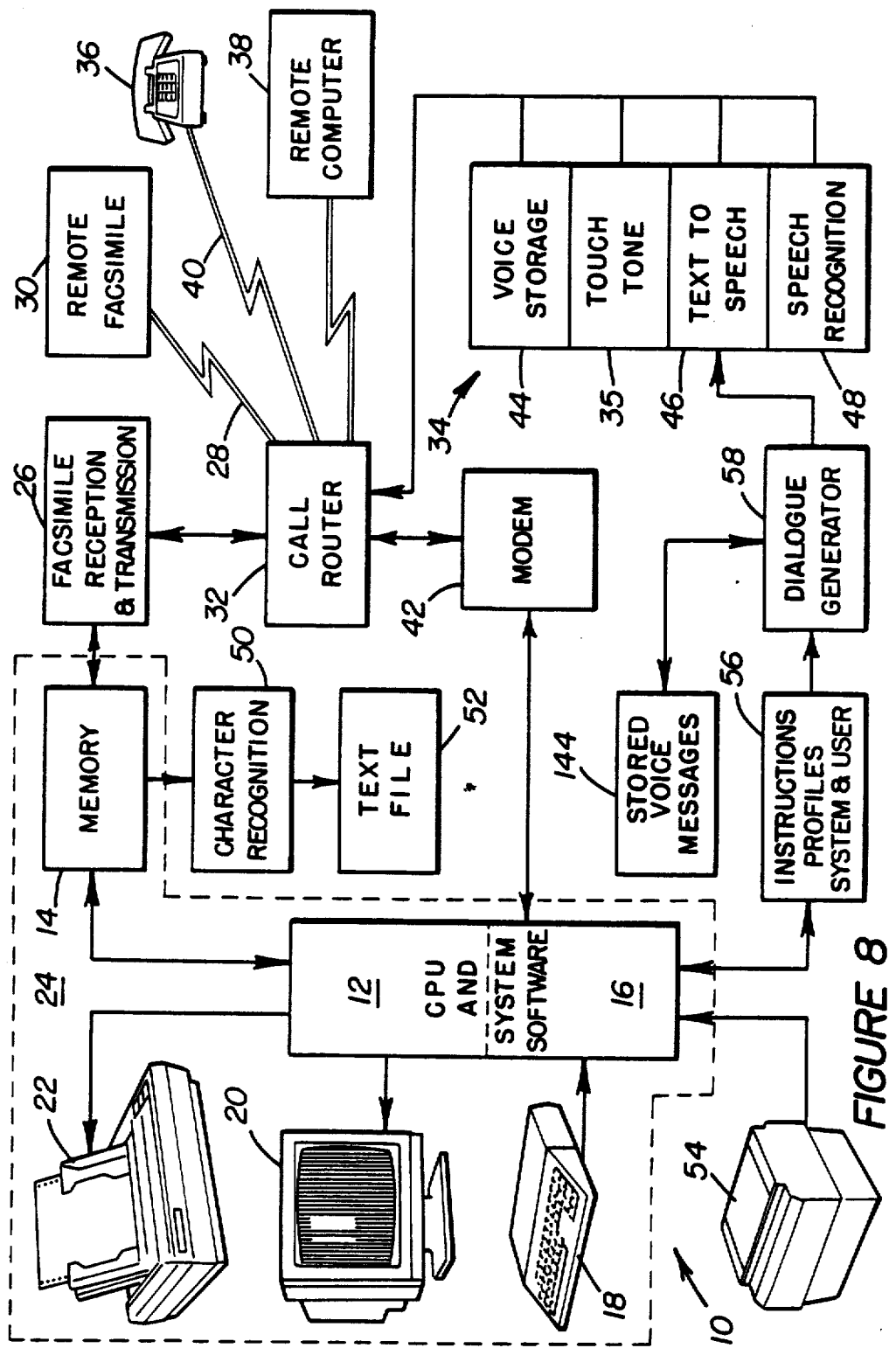
FIG. 8 is a schematic representation of the hardware necessary to implement this invention.

Referring now to FIG. 8 a system 10 is shown schematically which system consists of hardware and software necessary to operate the system. System 10 includes a processor 12 which may also be referred to as a CPU or central processing unit. Processor 12 has associated therewith a memory 14. The combination of processor 12 and memory 14 may be in any well recognized form of computer; however, it is pointed out that in the embodiment described herein, processor 12 and memory 14 are component parts of a personal computer of the IBM ® type. That is a computer including a micro processor of the 808X family or a derivative thereof. At least a portion of the memory should be of a non-volatile type as the system software 16 and other software to be described subsequently must be readily available at start up time. Memory 14 preferably includes a large RAM (random access memory) available for data manipulation. Further, memory 14 may additionally include portions in the form of a "floppy" disk or "hard" disk. None of these types of memory is shown in detail as they are well known in the art and are herein collectively represented by memory 14 shown in FIG. 8. Included with CPU 12 is "system" software 16 such as MS/DOS available with IBM type personal computers for an overall operating system. Other operating systems would also suffice particularly for other computer systems. The system also may include a keyboard 18 for entry of textual matter and for program control. A monitor 20 having a cathode ray tube for display or the like is also included, as is a printer 22. Printer 22 preferably should be capable of printing graphic images. This can be accomplished with such printers as the Hewlett Packard Laser Jet Series available from Hewlett Packard in Palo Alto, Calif.

Processor 12, memory 14, system software 16, keyboard 18, monitor 20, and printer 22 are all available in the market place and can be characterized as a personal computer. This personal compute has been enclosed in a dashed line and will be referred hereinafter as computer 24.

System software 16, which as previously noted is well known in the art, may for example be a disk operating system commonly referred to as DOS or MS/DOS. It is to be understood that other operating systems and other computers than the IBM type are equally applicable to this invention.

Essential to the invention is a device for receiving and transmitting graphic images. Such a device is commonly called a facsimile machine and is represented by the facsimile block 26. Facsimile machines come in various forms. Generally, a facsimile machine is a stand alone item that connects to a telephone line 28 (in the embodiment shown in FIG. 8, there is an intervening device called a call router which will be described in detail in the ensuing discussion) so that a graphic image may be transmitted to a remote facsimile 30. Remote facsimile 30, of course, is capable in transmitting graphic images of textual matter to facsimile 26. Facsimile reception and transmission device 26 is preferably in the form of an add-on "board" to computer 24. A board and associated software that fulfills all the requirements of this invention, except the capability of scanning a graphic image for transmission to a remote facsimile, is available from Gamma Link at 2452 Embarcadero Way, Palo Alto, Ca. 94303 under the trademark Gamma Fax. If a stand-alone facsimile machine is used, the machine must be capable of sending the received message on to memory 14 as a digital signal. In the preferred embodiment, the scanning capability is available in scanner 54 which will be described in more detail below. The system in FIG. 8 also includes a call router 32 which senses the incoming facsimile signal on telephone line 28 by recognizing the "handshake" of the remote facsimile 30. Upon such recognition the call router will direct the incoming signal to facsimile machine 26. Recognition of an incoming facsimile signal is done in the normal manner, that is a pulsed tone is sent by the remote facsimile 30. This pulsed tone is sensed by call router 32 which includes a touchtone chip 34 and associated software. Such a software algorithm is found in the BesTspeech TM Server Tool Kit part number 650 available from Berkeley Speech Technology at 2409 Telegraph Avenue, Berkeley, Ca. 94704.

Call router 32 is also equipped to receive incoming signals from a remote telephone 36 or remote computer 38. Remote voice telephone calls from telephone 36 are sensed by call router 32 by the absence of a tone or by the presence of a modulated tone caused by a human voice being sent over transmission line 40. Alternatively, if the caller at remote phone 36 fails to speak, the call router will wait a specified period of time, for example, 10 seconds, and play a recorded message asking for a touchtone signal from a human user at remote phone 36. Alternatively, voice commands could substitute for touchtone signals.

In the event, a remote computer 38 is calling into a call router 32 through a remote modem either in or associated with remote computer 38 (the remote modem is not shown) the call router will go through the same sequence, that is, listen for a fax tone, wait 10 seconds, play the recorded message and wait for a touchtone. Failing to receive either a fax tone, a modulated tone (voice) or a touchtone, the call router will automatically route the call to modem 42 for the usual "handshake" operation used between computers.

Call router 32, as noted above, includes in chip 35 a voice storage capability 44, touchtone capability 34, a text-to-speech algorithm 46, and speech recognition capability 48. This multi-capability, as previously mentioned, is available from Berkeley Speech Technology. The text-to-speech algorithm envisioned here is for synthetic speech.

The system 10 also includes certain software capabilities including a character recognition program 50 which is available from OCR Systems under the tradename ReadRight TM, model No. 8200-IXIIF or 8200-IX2IF. The ReadRight TM software is available from OCR Systems at 3434 Progress Drive, Suite I, Bensalem, Pa. 19020. Character recognition device 50 has the capability of "looking" at received facsimile graphic images in pixel form and converting the graphic images into ASCII character sets with a relative degree of accuracy such that intelligence can be made from the information. Once the character recognition is completed, the ASCII character set so developed may be stored in a text file 52 which may be a portion of memory 14.

System 10 also includes a document scanner 54 whereby a document, either textual or graphic or a combination thereof, may be scanned for input into the system in the form of a graphic image described above. Thus, scanner 54 may be used for preparing a document for facsimile transmission to a remote facsimile machine such as a remote facsimile 30 or to remote computer 38 where a character recognition device similar to character recognition device 50 may be located to convert the scanned image back into ASCII text, if the scanned image was textual in character originally.

Another feature of the present system is the ability of the Gamma Link facsimile board 26 to convert ASCII text to a graphic image. While this may seem redundant, it gives a capability to computer 24 of sending an ASCII text directly to another facsimile machine without the need of scanning.

The system includes, in software form, instruction profiles 56 which will be described in greater detail in the ensuing discussion of the software. In like manner, the dialogue generator 58 will also be discussed in the relation to the software.

THE SOFTWARE

FIGS. 1, to 7, 9, and 10 illustrate one embodiment of software shown in flow chart form that would be operable to perform the functions of the system described herein. In the flow charts, the incoming connector block indicates the figure from which the flow chart emanated while the outgoing blocks indicate the figure to which the program is going.

It is assumed that CPU 12 illustrated in FIG. 8 and the system software 16 also illustrated therein is readily available in the market place. For example CPU 12 may be an IBM personal computer while the system software 16 may be the familiar MS/DOS available with the IBM personal computer. The functions of the system software will of course include the capability to drive printer 22 and operate monitor 20 both are in response to keyboard 18. Included in system software 16 for the purposes of this discussion would be the associated software provided with a scanner 54. Those skilled in the art will recognize that when the equipment such as printer 22, monitor 20, or scanner 54 are added to a CPU 12 such as envisioned herein that each unit comes with its own system software. Likewise the facsimile and reception device 26 manufactured by Gamma Link as noted above is provided with a certain amount of software, which for purposes of this discussion is included in software 16.

Finally, in this description, the convention of setting a flag to 1 is used to denote an operation is to be performed at some later time. For example, the printing of a received facsimile may be requested by the "system" or by the "user" stored profile. It may also be requested by a user upon notification as will be described. It is to be understood that other methods could be used including immediate print-out, relay or the like without departing from the spirit of the invention.

Figure 1:
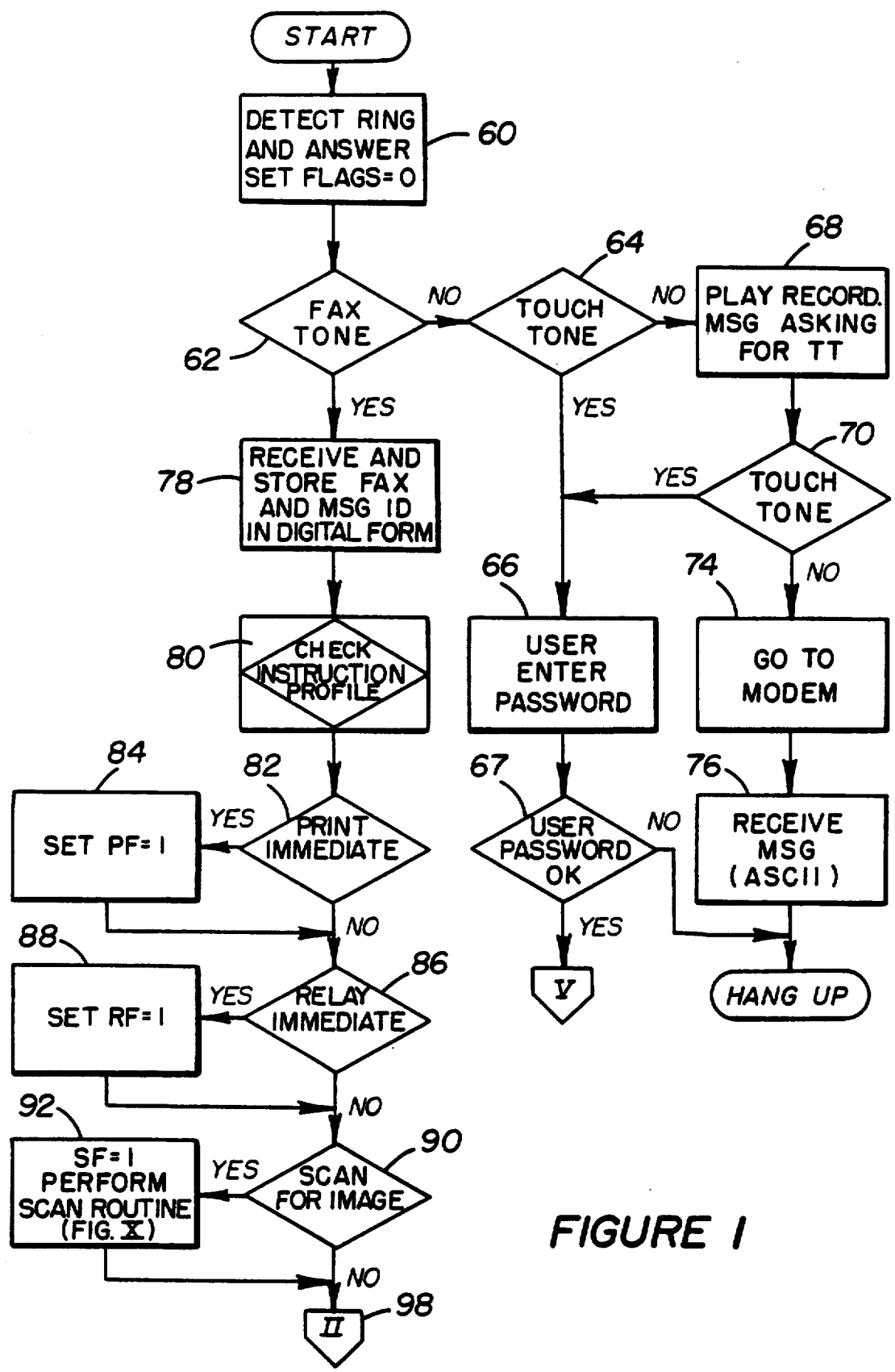
FIGS. 1 through 7, 9 and 10, consist of a flow chart, which represents the logic of the computer software necessary to accomplish the invention on the hardware depicted schematically in FIG. 8.

Referring now to FIG. 1, with the assumptions set forth above in mind, the flow charts shown in FIGS. 1 to 7, 9 and 10 are illustrative of a single operation caused by the reception of an incoming signal by call router 32 from a remote facsimile machine 30, telephone 36 (in the form of voice communication) or from the remote computer 38. Initially call router 32 performs a function set forth in FIG. 1. In particular call router 30 detects a ring by operation block 60 while simultaneously setting a series of flags to zero, each of which will be addressed subsequently. These flags are operable to control the various output functions of the software. Once the ring is "answered" by figuratively taking the "receiver" off the "hook", an initial determination is made in decision block 62 as to whether the incoming signal is a facsimile transmission from a remote facsimile such as remote facsimile 30, a voice telephone call from telephone 36 or a computerized call from the remote computer 38.

Taking first the possibility of a telephone call or remote computer contacting call router 32, decision block 62 would determine that no identifying facsimile tone or fax tone has been received. For purposes of this discussion, when a facsimile machine operates to contact a remote facsimile machine a series of tones which differ from the pulsed tones of a telephone are sent to the receiving facsimile machine. This "handshaking" is well known in the art and will not be discussed further other than to say that call router 32 includes necessary circuitry to determine the presence of the fax tone or not. Likewise, call router 32 includes the capability to determine whether a touchtone signal or a pulsed tone has been received from the remote site. Should a touchtone signal be received, the user, located at remote telephone 36, who had generated the touchtone signal, for example the signal generated by the # key would follow immediately with a user password using the touch tone key pad of the remote telephone 36. (Some systems may automatically send a touchtone signal as part of the dial up process.) That user password is checked by the software herein described in decision block 67. Should the user password be proper, the program jumps to FIG. 5. On the other hand, if the decision block 66 determines that the user password is incorrect, the call router "hangs up." (Provision can be included, although not illustrated here, to include a request to the user to reenter his or her password.)

Should the touchtone decision block 64 determine that no touchtone signal has been sent then a recorded message stored in voice message section 144 (FIG. 8) is played through the call router as indicated in operation block 68. This recorded message asks for a touch tone signal. This system is particularly appropriate where a user is calling from a public telephone. A dedicated line may, on the other hand, include as an initial step the sending of a touchtone signal thereby precluding the recorded message. If no touchtone signal is received as indicated in the decision block 70, call router 32 will route the incoming message to a modem 42 for further communication to CPU 12. The capability to send and receive a text file is included with the Gamma Fax hardware and software identified above and is contained in Fax board 26 and the associated software. Such capability is well known in the art and may be accomplished by many commercially available modems which not only include the necessary hardware but also the software for such capability.

When the well-known handshaking routine is accomplished by modem 42, the message is received as indicated in operation block 76.

Should a fax tone have been received by decision block 62 then the incoming facsimile signal is received and stored as indicated in operation block 78 by routing the incoming call at call router 32 to facsimile reception and transmission software and hardware contained in the facsimile portion of the computer as indicated by the facsimile block 26 in FIG. 8. It is to be understood that this incoming facsimile, as is usual in the reception of facsimile data, will contain an identification number in ASCII code or its equivalent which may indicate the name of the originator, or the originator's telephone number. The remainder of the message will be in what is called graphic format or image format. Image format, as has already been explained, is represented by pixels wherein each pixel represents the presence or absence of a dot with the entire set of pixels representing the image. The incoming facsimile will be stored in its entirety in computer memory 14.

Once the incoming facsimile has been received and stored, an instruction profile is checked. This instruction profile, as indicated in the combined operation and decision block 80, is at the system level. That is in an installation such as envisioned here, where there are multiple users, an over all instruction profile may be common to all users. For example, it may be appropriate to print all incoming facsimiles immediately or only selected incoming facsimiles. Further it may be appropriate to relay all or selected incoming facsimiles to some other remote facsimile machine. Thus, in the software associated with combined decision and operation block 80, each incoming facsimile's message identification (which is in ASCII coded form) is checked against the system selected options. For example, incoming messages from originator A may all be printed while incoming facsimiles from originator B are stored pending instructions at some later time.

In the system illustrated, since there are other instruction profiles to check which may include instructions to print or relay, a print immediate block merely sets a flag, for example PF (Print Flag), equal to 1 as indicated in decision block 82 and operation block 84. Likewise, an instruction to relay the facsimile immediately as indicated in decision block 86 and operation block 88 would, at this point, set a flag such as RF (Relay Flag) to 1 so that not only the system profile but also the forthcoming user profile can be checked before relay or printing occurs.

There will be times when an incoming facsimile will be received from a machine having an unknown identification. For example, a remote user may send a facsimile from a commercial organization such as a hotel or some other facsimile originating location. Of course the identification line on an incoming facsimile from such a location, as it is received in this system, will not be recognizable by the present profiles. However, should the incoming facsimile have been originally printed on paper carrying a logo or a letterhead, it may be appropriate to a scan for the presence of that logo in order to identify the originator. Should the instruction profile so direct, the scan for image decision block 90 will jump to the scan function illustrated in FIG. 10. It is to be understood that operation block 92 which actually forms the basis for the jump routine or interrupt will set a scan flag such as SF equal to 1 so that the scan function is not performed twice.

Figures 10, 10A:
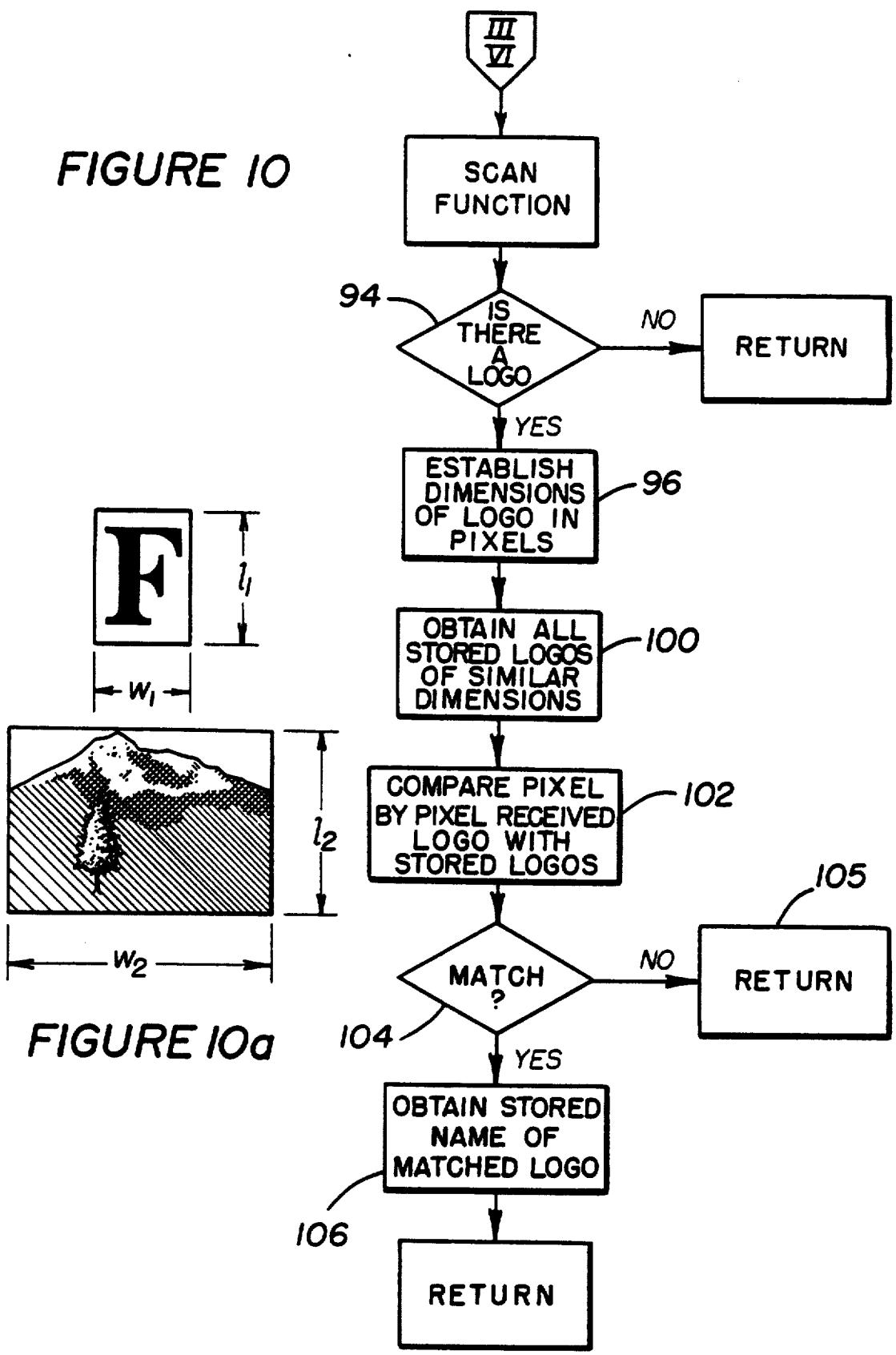
FIG. 10a is a comparison of a letter F in graphic form and a logo.

Referring now to FIG. 10, the scan function can be performed in the following manner. Initially the received graphic image is checked to see if a logo exists as indicated in the decision block 94. This is best illustrated with reference to FIG. 10a where the capital letter F is illustrative of a textual figure received in graphic format. As has been noted, each letter or character ordinarily encompasses a given amount of space in a graphic document, for example, the letter size maybe as much as 10 by 15 pixels. As indicated in FIG. 10a, the width $W_1$ would be 10 pixels and the length $L_1$ would be 15 pixels. Should there be an area present in the received textual material wherein the dimensions of the received image exceeded 10 by 15 pixels, an assumption could be made that it did not contain textual matter. The software associated with this decision block also includes a limitation that a logo must be received, for example, in the first two inches (50.8 cm) of the received data. As previously noted, a facsimile is sent at rate of 1,056 lines per eleven inch (27.94 cm) page. Thus, the routine would only check the first 192 lines of received graphic image. If, in the first 192 lines of received graphic image it is determined that an area greater than a certain limit contained information, then operation block 96 would establish the dimensions of that area in pixels. If, on the other hand, there was no identification of an incoming logo, ("no match") the scan function would terminate and return the program to connector block 98 in FIG. 1. Whether or not a "match" occurred the scan flag SF would remain on or set to 1.

Once the dimension of the incoming logo had been determined in pixels, then all stored logos having similar dimensions could be obtained from memory 14 by operation block 100. A comparison on a pixel by pixel basis of the stored logos with the received logo is then accomplished in operation block 102. The user is provided with a match parameter such that if there was a match of 95% of the pixels between the stored logo and the received logo then the "match" would be determined to have occurred. If the match rate was below the selected percentage, the scan function, after checking all of the stored logos with the same dimensions, would return to connector block 98 with a "no match." If a "match" does occur as indicated in decision block 104 then the received facsimile can be considered to have come from an organization that is known. As a consequence, the name of the organization with the matched logo is obtained and associated with the received facsimile. This is represented by operation block 106.

The stored logos referred to in this last sequence in operation block 100 and operation block 102 are obtained in the usual manner utilizing scanner 54 to "read" desired logos into memory 14 in graphic format. This may be done in the usual manner and then followed by calling up the stored logo utilizing programs such as the Microsoft Paint Brush available from Microsoft at 16011 N.E. 36th Way Box 97017, Redmond, Wash. 98073. With the logo available for display on display 20, the dimensions thereof may be entered into appropriate tables along with the known owner of the logo.

Figure 2:
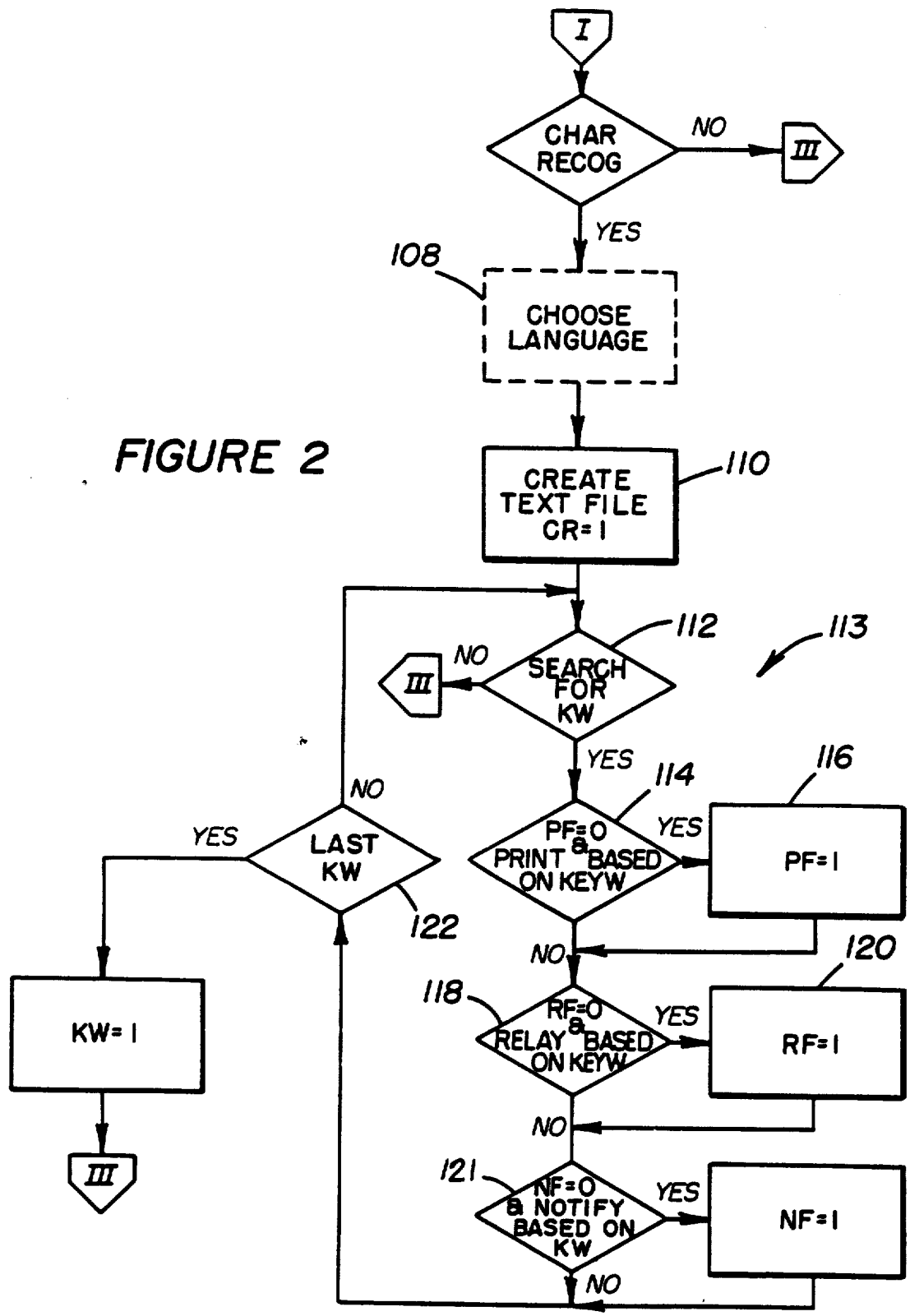
Figure 3:
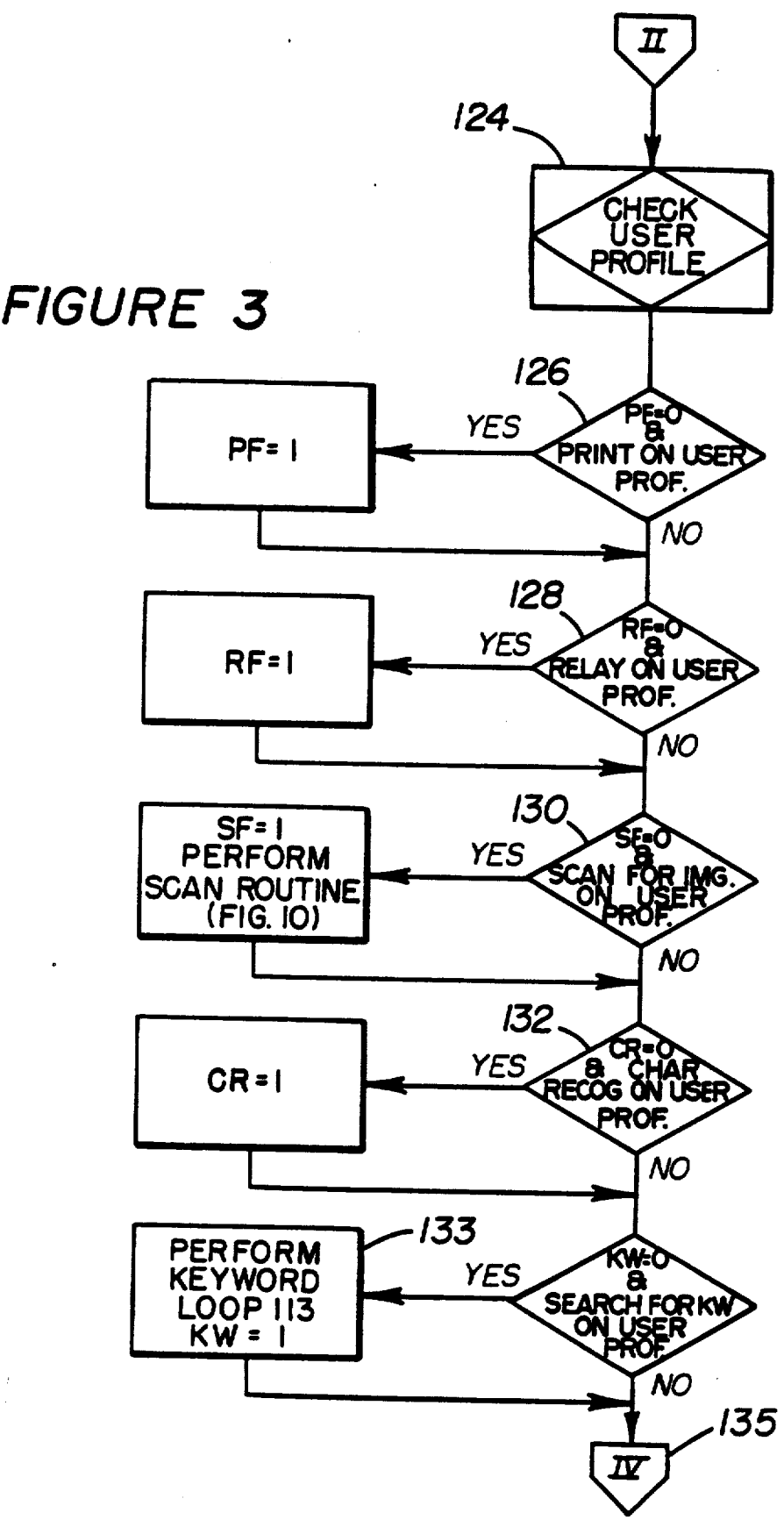

Referring now to FIG. 2, the received facsimile, still being stored in memory 14, may then be checked for character recognition. Again, it should be understood that character recognition at this point would be undertaken at the instigation of the system instruction profiles. That is, such would occur if the system had previously been programmed to perform this function for the identified facsimiles. Character recognition would normally be done on a selected basis based on the message identification received with the original fax or if the scan function has been utilized based on the originator determined by the scan function. The first step in the character recognition program, once it has been decided to perform this function, is to choose a language as indicated in the dashed box operation block 108. This operation box has been purposely dashed as this system provides for the capability of recognizing languages other than the English language. Thus the system may be configured to operate in a foreign language or alternatively foreign languages may be utilized for particular originators as identified by the message identification. Since the language choice is an alternative it has been placed in dashed lines. If character recognition is desired, the system would establish a text file to receive the character recognition data. This file is created utilizing software call ReadRight TM. The ReadRight program is available from OCR Systems, 3430 Progress Drive, Suite I, Bensalem Pa. 19020. The ReadRight program scans the received graphic image and translates the graphic images into ASCII text. It is to be understood that the ReadRight program is not perfect; however, it does provide capability of obtaining up to 90% translation or better from graphic to ASCII text where the graphic is of a widely used type font such as courier or the like. Once the text file is created, then a flag CR, for create text file, is set to 1. This is to obviate the second creation of the text file based on the user profile which is to be explained.

Having created the text file by operation block 110, the system profile now has the capability to search for keywords as shown in loop 113. Again, keywords can be entered into the instruction profile either by the system or by the user and may be a selected group of words that are of immediate interest For example, if a salesman was awaiting information on turbine specifications, keywords such as "turbine", "power", "fuel" and the like could be entered into a keyword tile associated with a particular group that may be sending such data into the present system. On the other hand the keywords may be used generally for all information arriving at the system. If the decision block 112 is selected to search for keywords then the created text file is looked at word by word to determine if the keyword or keywords are contained therein. A decision block 114 is located in the keyword loop to determine if an immediate print based on the discovery of a particular keyword or series of keywords may be in order. If so, the print flag is turned on as indicated in operation block 116. Similarly, a relay to a remote site may be in order based on located keywords as indicated in decision block 118 and the associated operation block 120. If the decision is made to relay then the RF flag is set on. A similar situation would occur if the system profile was set to notify a user based on keywords as dictated by decision block 121. The keyword loop continues until the last keyword has been checked as indicated in the decision block 122. The keyword flag KW is then set to 1 to prevent this loop from being repeated based on the user profile Referring now to FIG. 3, the user profile, which has been pre-entered by a particular user is checked. This sequence would start with operation block 124 which again is overlaid with the decision block followed by the same sequence as set forth above for the system profile. That is the user may request printing as indicated in decision block 126, relay as has been requested in decision block 128, or scan as indicated in decision block 130. The character recognition block, decision block 132, if character recognition is requested, performs essentially the same function as set forth in FIG. 2. Similarly, if the user profile directs a keyword search, keyword loop 113 shown in FIG. 2 at operation block 133, will be performed, operation block 133, with a return to connector block 135.

Figure 4:
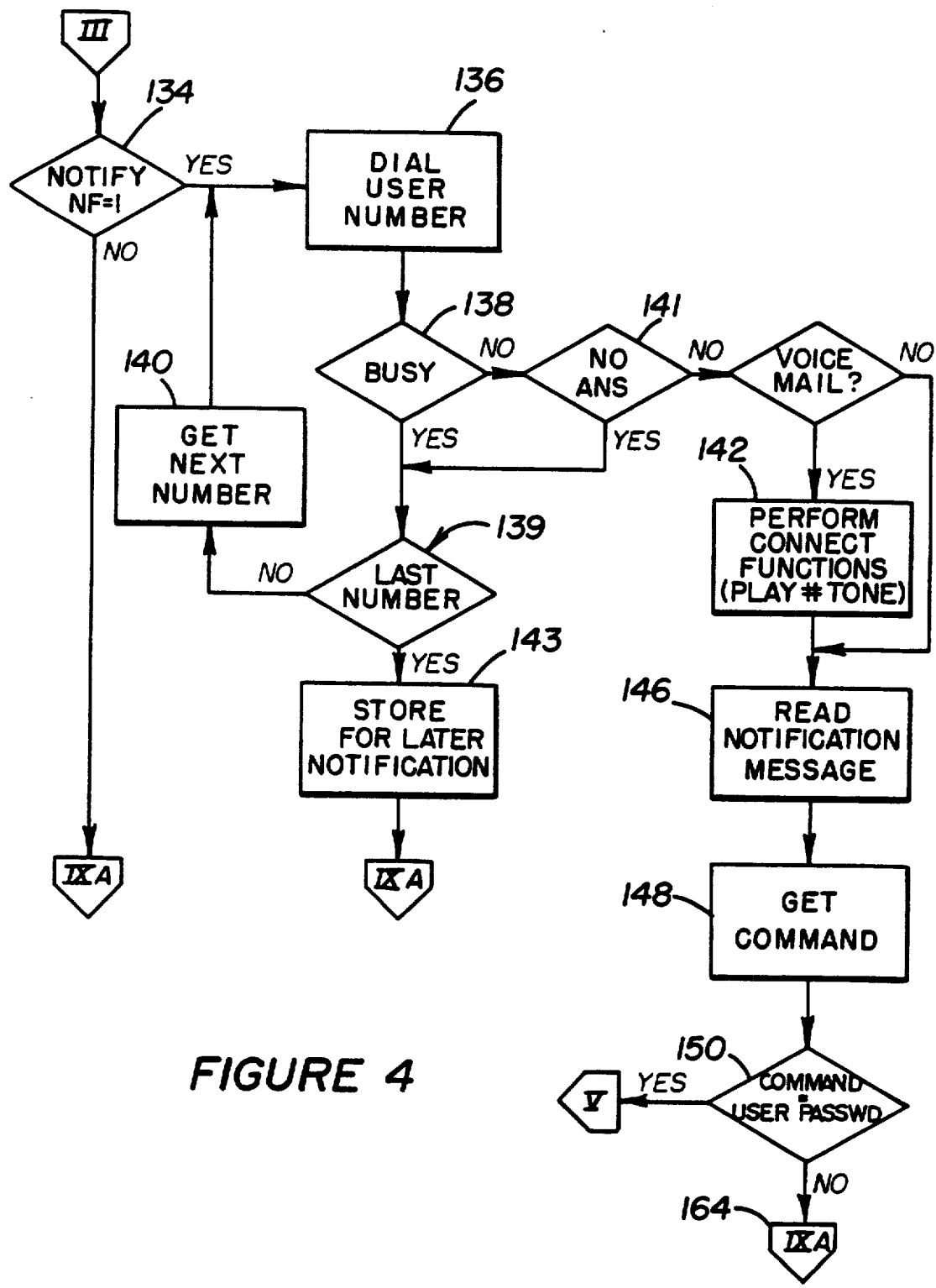

Referring now to FIG. 4, either the system or user profile can direct that the addressee of the received facsimile be notified. This is indicated by the decision block 134 in FIG. 4. The basis of the decision taken in decision block 134 is gleaned from the information obtained by the preceding steps. It is well known, that in the current state of the art, the addressee of an incoming facsimile is not readily identifiable as an entity in a computer except as a graphic image. For example, if a facsimile is sent to a large corporation and the intended addressee is one of the officers of the corporation some human intervention is currently required to pass that particular facsimile on to the addressee in the corporation. Specifically, a human must read the incoming facsimile (the graphic image) to see who the addressee is. In the present invention, a good deal of this human intervention, if not all of the human intervention, can be overcome by parameters entered into the system by addressees. Specifically, an addressee may ask that all correspondence received from a particular organization results in notification of the addressee. Secondly, prospective addressees can include his/her surname in the keyword search so that if a "match" is found in a keyword search the system will automatically notify the prospective addressee. Finally, prospective addressees may include a group of keywords such that any incoming document containing that group of keywords will result in notification. The notification sequence indicated in FIG. 4 includes automatic dialing of a stored user number as indicated in the operation block 136. Should that user number or addressee number be busy as indicated in decision block 138, a second attempt will be made to contact the user using either the same number or the next stored number as the case may be. This is indicated in decision block 139 and operation block 140. If there is no answer, decision block 141, then the same sequence of obtaining the next number followed by a redial may occur. If the number called is the last number in a sequence, then the message can be stored for later transmission If the line is not busy then an inquiry can be included to determine if the answering system includes voice mail. If such is the case, then the connect functions as indicated in operation block 142 may take place. This may include such things as sending out the "pound" tone of a touchtone telephone to terminate the recorded message. Once a connection is made, then the notification message, which has been prepared based on the message identification or the identification associated with the scanned image stored in memory in particular location (see FIG. 8 block 144) and which may include portions of the text file is transmitted to the user. This notification message is signified by operation block 146 in FIG. 4. The system may then ask whether the user requests additional information as signified by the "get command" in operation block 140. If the connection is to a voice mail box, it should be understood that there will be no response from the voice mail system hence there will no user password obtained in decision block 150, otherwise the system will check the password and, if acceptable, will proceed on to the user requests. Again, if the system called is a voice mail system then there will be no verbal response or touchtone response and thus, no user password requested. Should that occur the system then will default to the routine shown in FIG. 9.

Figure 9:
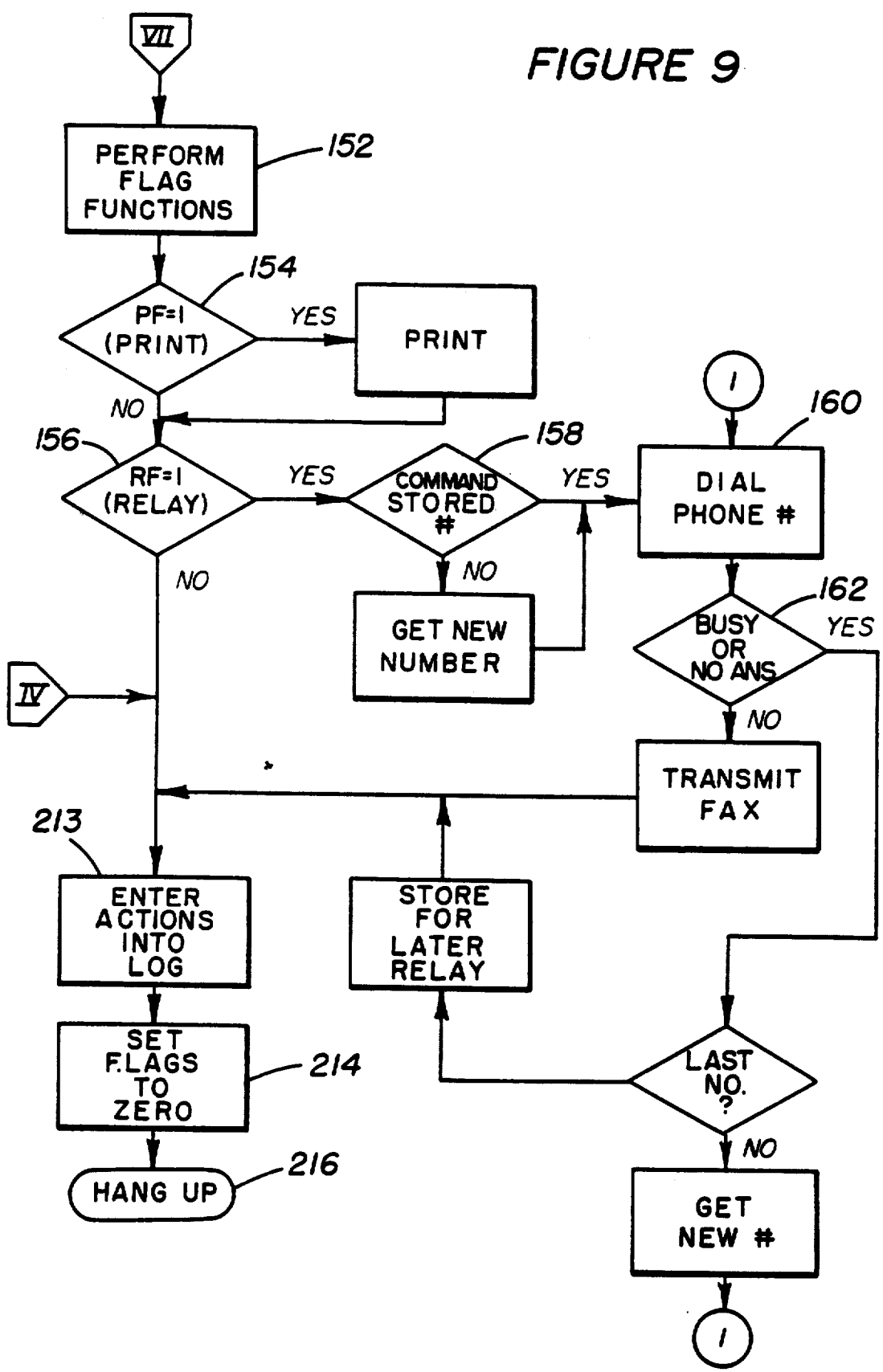

Referring now to FIG. 9, it should be remembered that during the initial phase of this program, there may have been a request for an immediate print or an immediate relay either based on the system profile or the user profile. Thus, before the system goes back to standby and returns to the condition set forth in FIG. 1, the flag functions must be performed. This is indicated in operation block 152 and the immediately following decision 154 and 156. In decision 154 the system responds if the print flag has been set on, that is if PF is equal to 1 the system will print the facsimile "immediately". It should be understood that this print function is a reproduction of the graphic input of the facsimile and not the ASCII text. However, it is in the purview of this invention such that ASCII text if produced by the character recognition portion of this program may also be printed out along with the graphic image or saved for later use.

Decision 156 is implemented if the facsimile should be relayed. If such is the case, then the system will ask if there is a request for new number in decision block 158. It should be understood that this decision block 158 only comes into play during the interface between the addressee or user and the system which will be described below. If the "command" equals the stored number which, of course, it would if there were no interface between the user and the system, then the stored number will be dialed and the facsimile transmitted in the normal course of the events as indicated by operation blocks 160 and 162. If there is an interface between the user and the system, then a new number may be entered by the user at that point using the touchtone pad on remote telephone 36 (see FIG. 8). Once the flag function has been performed, the system will reset the flags to zero and return to its stand-by status to await the next incoming phone call.

Figure 5:
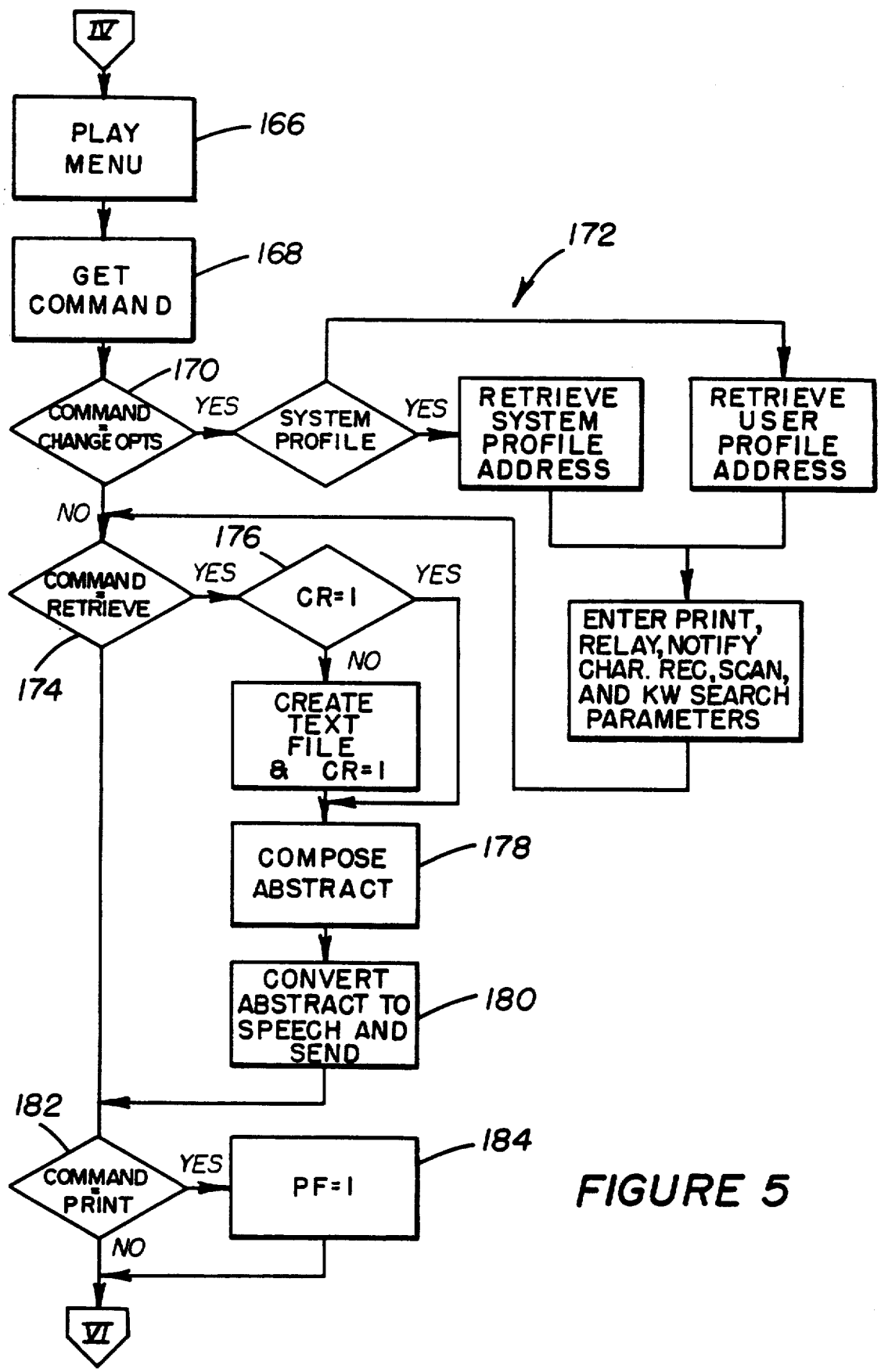

Referring again to FIG. 4, if there is a valid user password in response to the Get Command (Block 150), that is an interface has been established between th system and the user through the notification program, then the sequence set forth in FIG. 5 will follow.

Referring to FIG. 5, it should be understood what the relationship between the system and the user is. On the one hand, the user may be in contact with the system through a remote telephone such as telephone 36 (see FIG. 8) or on the other hand through some other device such as keyboard 18 or remote computer 38. The first step in FIG. 5 is to "play" a menu providing the user the various options available. This is depicted by operation block 166 in FIG. 5. The menu may be transmitted to the user on telephone 36 in an aural sense or may be visually presented if contact is through the keyboard of a remote computer. The menu will provide the user with various options which may be implemented by pressing a particular number on the keypad or keyboard. In the present embodiment, these options would include:

1. Change option
2. Retrieve facsimile
3. Print
4. Relay
5. Scan
6. Keywords
7. Recorded message
8. Refile 9. Stop Should the user elect to change options that is select option 1 on the menu, the program will branch on decision block 170 so that either the "system" profile, if the user is given this option, or the "user" profile may be corrected or amended. This procedure is indicated by the loop 172 (FIG. 5).

Should the user opt for obtaining an abstract through the "command equal to retrieve" at decision block 174, the first step, as indicated in decision block 176 wherein the retrieve flag is checked, is to see if a text file has been created. Reference should be made to FIG. 2 wherein the procedure for creating a text file utilizing the ReadRight Program is discussed. Should the file be available then an abstract can be composed from the textual matter along with any other information available such as the identification number of the sending station, with associated preselected identification data as indicated in operation block 178. This abstract may be transmitted immediately to the user utilizing the text-to-speech capability 46 as shown in FIG. 8 or the abstract may be stored in memory 14 to be sent later based on a different option. Preferably the composed abstract would be sent at this point in this program as indicated in operation block 180.

Should the user request the received facsimile be printed as shown in decision block 182, then the print flag will be set to 1 as shown in operation block 184 for subsequent print out. Of course, it should be understood that if the print flag has been set to 1, at a previous point in the program, the resetting of the flag at this point will not change the program as the print flag is not to be considered a "toggle" command.

Figure 6:
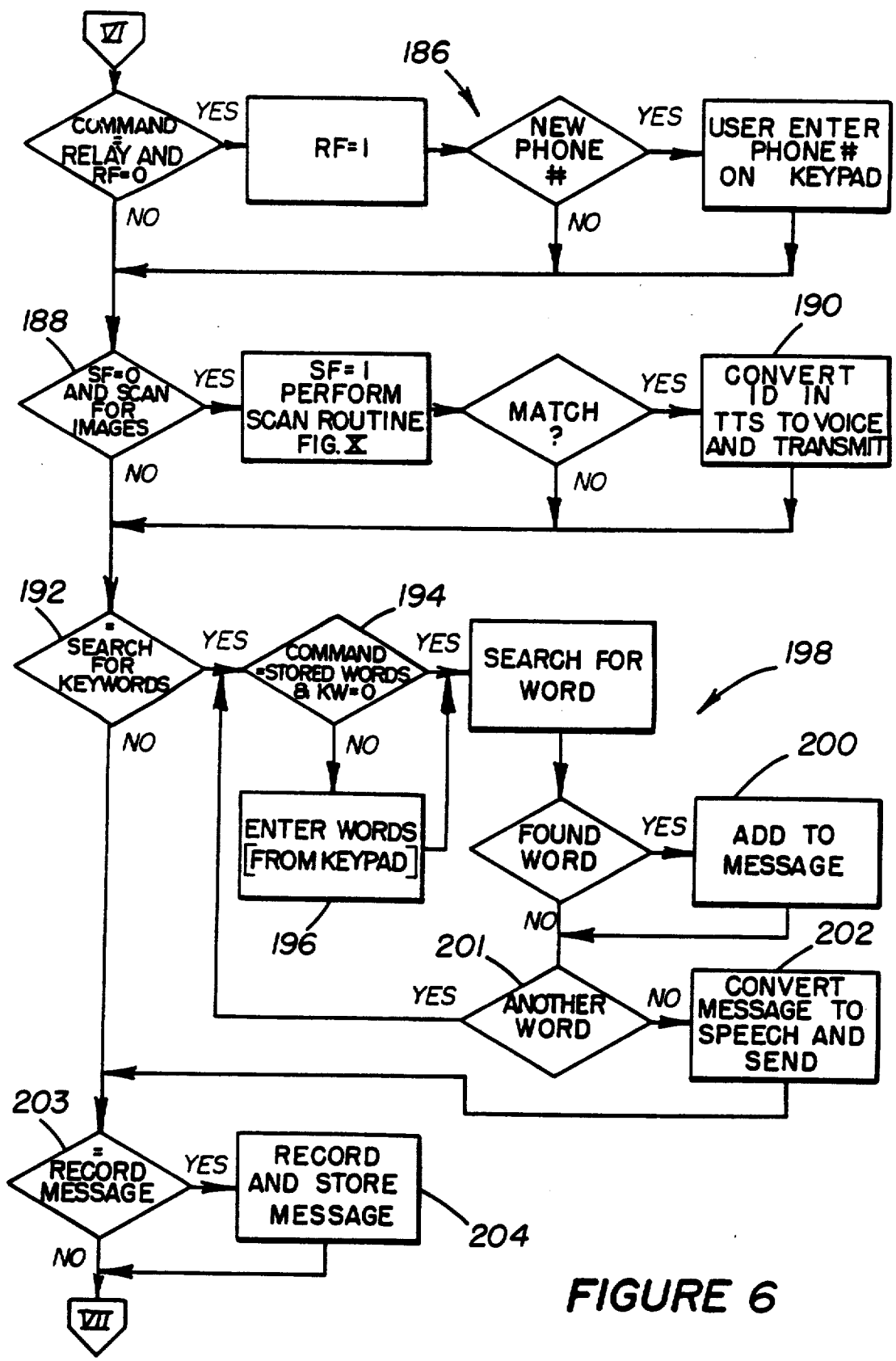
Figure 7:
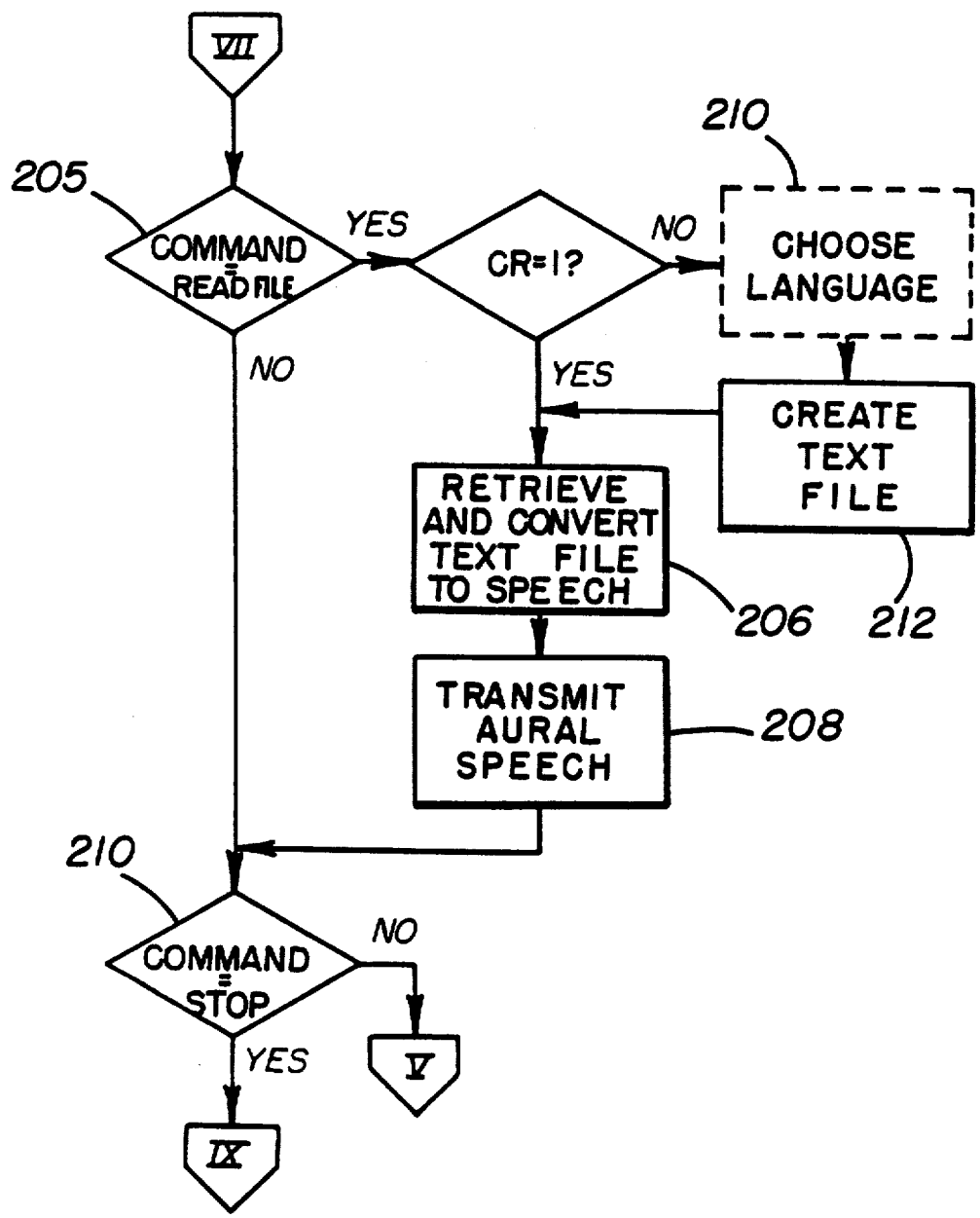

Referring now to FIG. 6, the user has the option of requesting from the telephone keypad at remote telephone 36 that the facsimile be relayed. Should such be the case, then the relay flag RF is set to 1. The user may also be given the option of entering a new phone number as indicated in loop 186. The purpose of giving the user the capability adding the new phone number is to cover those situations where the user is calling from a remote site not ordinarily frequented by the user. As can be seen the system permits the user to enter a regular phone number in his or her user profile or on the system profile for a particular facsimile machine so that facsimile can be regularly forwarded either on system profile basis or the user profile basis to that phone number. In this instance, the user is on line with the system and can request the facsimile be sent to some other machine than the "regular" machine.

A command for the machine to scan for images as indicated in decision block 188 is also provided to the user for remote implementation. This provision will be of particular help if the facsimile had originated from an unidentified location such as a commercial facsimile sending station and the user has not previously asked the system to scan for images either in the user profile or system profile as described above. Upon notification of the arrival of an unidentified facsimile, the user could initiate the scan function as described above and depicted in FIG. 10. Should this option be selected, the "return" at block 105 would either indicate a "match" or "no match" with the stored logo. If there was a match, then the identification found in the scan function would be converted in operation block 190 into synthetic speech in the text-to-speech module 46 or a recorded message could be used or a combination of both.

The converted voice message would then be transmitted to the user.

If the user desires the system to do an additional search for key words then decision block 192 is implemented (FIG. 6). The system will either search for the stored keywords if it has not already done so (see decision block 194) or provide the user with the capability to enter new keywords from the keypad or a keyboard in operation block 196. This keyword search may be particularly important if the user is operating from a remote computer, such as remote computer 38 (FIG. 8) wherein ASCII text can be more readily entered into the keyboard of the remote computer. Loop 198, which performs the actual keyword search, differs somewhat from the keyword search in FIG. 2. It should be pointed out that in FIG. 2 the search for keywords did not produce anything but the possibility of a "print" based on the keywords found or a "relay" based on the keywords, or a "notify" based on the keywords found. In the instance where the user is in communication with the system a verbal message may be created. While the exact wording of the message is left up to the user, an appropriate message for the system would be "the system has found the following keywords:" followed by the list of the keywords. The keywords would be added to that message in operation block 200 in textual form (see also dialogue generator 58 in FIG. 8). Once the search is completed, (decision block 201) then the entire message including the key words would be converted to speech in operation block 202 to be sent to the user through call router 32. If the user was at keyboard 18 or on a remote computer 38, the message would be sent in ASCII text.

The user is also given the option of recording a message just as in any voice mail system. This is represented in decision block 203 with the recording taking place in operation block 204. Here again, this particular option would be appropriate if the remote user wished to leave a message for the operator for example or if the user is changing the stored voice messages such as the one just described in relation to the search for keywords.

Referring now FIG. 7, the user is again given the option of obtaining at least portions of a converted file in aural form. Thus, the incoming facsimile may in effect be "read" to the user should the user so opt in this particular sequence. This is represented by the decision block 205. Again, if the system profile had created a text file from the graphic image as described in relation to FIG. 2, the system will retrieve and convert that text file to speech as indicated in operation block 206 followed by transmission of the converted speech as shown in operation block 208. On the other hand, either the system profile or the user profile may not have converted the graphic image to a text file thus that may have to take place at this point with the user on-line. In this case, the language option may be chosen as indicated in operation block 210 and the created text file would result using the ReadRight program as indicated in operation block 212. Subsequently that text file will be converted to speech in the language selected and transmitted to the user in the same manner as described above.

Finally, the user is again given the option of utilizing any one of the afore-described options as indicated in decision block 210. Decision block 210 is the final option that can be entered from the keypad, that is to stop the interaction between the user and the system. Should the user elect to obtain more information then the system will jump back to the loop as shown in FIG. 5 again playing the menu as indicated in operation block 166. This loop will continue until the user transmits a stop signal.

Once the stop signal is transmitted then the system shifts to the final loop as shown in FIG. 9 as described above. It is at this point that the print and relay functions are performed. Again, it should be noted that in the relay function, a new number can be entered from the keypad. This corresponds to loop 186 in FIG. 6.

After the print and relay functions are performed, the actions taken with respect to the incoming facsimile are recorded and the facsimile stored if required by the system as shown in operation block 213. All the flags are set to 0 as indicated in block 214, the call is terminated as indicated in termination or "hang up" box 216 and the system goes back to a wait state.

The description for notification to a remote telephone site such as telephone 36 is equally applicable to notification directed to a remote computer such as remote computer 38 as shown in FIG. 8. Specifically, remote computer 38, and the sequences starting in FIG. 5 would be as with a manned terminal so that the menu indicated in FIG. 5 could be displayed on a remote computer display device and an interaction commenced between the remote computer 38 and program as described herein. Of course, the transmission of aural speech which would occur in block 180 in FIG. 5 and also the messages sent in FIG. 6 at blocks 190 and 202 could still be sent utilizing the speaker capability available in some personal computers. On the other hand, it is within the capability of this system so that the text-to-speech capability, when in contact with a remote computer 38, could be augmented by the transmission of ASCII coded characters either simultaneously with the speech or without the speech capability.

OPERATION OF THE PREFERRED EMBODIMENT

Operation of the afore-described system should be apparent to those skilled in the art. However, reference is now made to FIG. 8 to summarize of the operation of the system.

The system consists of a computer 24 having the usual peripheral devices such as a printer, a display screen, a keyboard and a memory. In addition, the system preferably includes a scanner 54 along with the facsimile and reception board 26. Also, included is a character recognition system 50 along with various software modules described previously. The system, gives the upper capability of receiving a remote facsimile through the facsimile board 26 in a graphic format. The received facsimiles are then stored in memory 14 in graphic form along with a capability to convert that facsimile into ASCII characters so that a text file in ACSII code of the graphic image may be created. Various options are provided either at the system level or the user level to perform certain operations based on an incoming facsimile. Specifically, the facsimile can be printed out in the normal manner or can be converted to speech through text-to-speech module 46 and transmitted through call router 32 either to a remote telephone 36 or to a remote computer 38. Also, included in the system is the capability to recognize speech coming from the remote telephone 36 over transmission line 40. The speech recognition system may give the capability to identify the user so that the degree of security is built into the system.

As described above, the system can receive and distinguish a facsimile, a voice message or a computer message. If a facsimile is received, the system can then, based on previously entered information, notify an addressee at a remote site of the contents of the facsimile. Further, the system can receive a voice message and then based on various commands relay information received by facsimile either in its entirety or in abstract form.

While this invention which has been described in relation to particular configuration, is not to be considered so limited. Other configurations within the scope of the claims should be considered within the spirit of this invention. In particular, the invention is limited only and the extent of the limitations contained in the appended claims.

I claim:

1. A device for converting a graphic image of into spoken words, the graphic image represented by a single string of data composed of an ordered set of pixels, where each pixel may be represented by a binary bit, the device comprising:
   computer data means for manipulating strings of data;
   storage means for storing the graphic image in binary form as a single string of data, at least some of said graphic image representing written words;
   recognition means for recognizing, assembling and processing at least portions of the graphic image into groups of coded characters each coded character represented by a plurality of more than one but less than nine binary bits and each coded character capable of being manipulated as a separate string of data by the computer data means; and
   text-to-speech means for converting the groups of coded characters into spoken words.

2. The device of claim 1 further comprising facsimile means for receiving from a remote sender and transmitting to a remote receiver graphic images of textual material.

3. The device of claim 1 further comprising facsimile means for converting binary coded data strings, each string representing a character, into areas of pixels having dimensions of n bits by m bits, said facsimile means further for transmitting said nxm areas of pixels to a remote site.

4. The device of claim 1 further including means to store recorded spoken words and wherein the text-to-speech means includes means for serially mixing recorded spoken words with spoken words obtained from converting groups of coded characters whereby the recorded spoken words and the spoken words obtained from converted groups may sequentially heard.

5. The device of claim 4 wherein the computer means further includes scanner means for optically scanning marked pages and converting the markings into string of binary bits;
   processor means for manipulating said strings of binary bits; and
   printer means responsive to said processor means for printing pages of said strings of binary bits whereby the printed pages substantially resemble the scanned marked pages.

6. The device of claim 2 further comprising:
   logo storage means for storing known images along with a unique identification
   logo recognition means for comparing portions of a received facsimile images to known images to identify the remote sender of at least some of the received facsimile images.

7. The device of claim 2 further including keyword means for comparing groups of coded characters converted from graphic images by said recognition means to known groups of coded characters 8. The device of claim 6 further including:
communication means for establishing telephonic communication over telephone circuitry with a human being remotely located relative to said device; and
notification means responsive to the coded characters converted by said recognition means for activating said communication means to notify a human being remotely located from said device of the presence of said facsimile.

9. The device of claim 1 further including:
communication means for establishing telephonic communication over telephone circuitry with a human being remotedly located relative to said device; and
notification means responsive to the coded characters converted by said recognition means for activating said communication means to notify a human being remotely located from said device of the presence of said facsimile.

10. The device of claim 7 further including:
communication means for establishing telephonic communication over telephone circuitry with a human being remotedly located relative to said device; and
notification means responsive to the coded characters converted by said recognition means for activating said communication means to notify a human being remotely located from said device of the presence of said facsimile.

11. The device of claim 3 further including means to store recorded spoken words and wherein the text-to-speech means includes means for serially mixing recorded spoken words with spoken words obtained from converting groups of coded characters whereby the recorded spoken words and the spoken words obtained from converted groups may sequentially be heard.

12. A computerized system for converting to the spoken word a series of graphic images of textual material represented by a set pixels, where each pixel represents the presence or absence of shade of gray and wherein each pixel may be represented by a binary code, the computerized system comprising
a processor including operating system means for manipulating binary coded strings of data;
memory means responsive to the processor; for receiving, storing, and making available to the processor binary coded strings of data;
means for receiving binary representations of a series of graphic images at least some of said graphic images representing written words;
recognition means responsive to the processor for assembling and converting at least a portion of received binary representations of said series of graphic images into coded characters capable of being manipulated by said processor; and
text-to-speech means for converting groups of coded characters into spoken words.

13. The system of claim 12 wherein the text-to-speech means further includes language means responsive to said processor for directing the conversion of groups of words to be accomplished such that the spoken word shall be in a particular language.

14. The system of claim 13 wherein the processor includes means for converting textual matter represented by binary coded characters into a graphic image wherein the binary coded characters are represented by pixels, each pixel being represented by a binary digit.

15. The system of claim 13 wherein the means for receiving binary representations further includes means for transmitting a graphic image to a remote site.

16. The system of claim 15 further including reception means for receiving data from a remote site, said reception means further including means for distinguishing voice communications from binary representation of data.

17. The system of claim 15 further including input means for inputting textual matter in a character by character manner, each of said characters uniquely represented by a group of at least five binary digits; and
text to graphic conversion means for converting groups of binary digits representing characters to strings of binary digits representing a graphic depiction of the inputted textual matter.

18. The system of claim 12 further comprising facsimile means for receiving from a remote sender and transmitting to a remote receiver images of textual material.

19. The system of claim 18 further comprising:
logo storage means for storing known images along with a unique identification
logo recognition means for comparing portions of a received facsimile images to known images to identify the remote sender of at least some of the received facsimile images.

20. The system of claim 18 further including keyword means for comparing groups of coded characters converted from graphic images by said recognition means to known groups of coded characters.

21. The system of claim 18 further including:
communication means for establishing telephonic communication over telephone circuitry with a human being remotely located relative to said device; and
notification means responsive to the coded characters converted by said recognition means for activating said communication means to notify a human being remotely located from said device of the presence of said facsimile.

22. The system of claim 19 further including:
communication means for establishing telephonic communication over telephone circuitry with a human being remotedly located relative to said device; and
notification means responsive to the coded characters converted by said recognition means for activating said communication means to notify a human being remotely located from said device of the presence of said facsimile.

23. The system of claim 20 further including:
communication means for establishing telephonic communication over telephone circuitry with a human being remotely located relative to said device; and
notification means responsive to the coded characters converted by said recognition means for activating said communication means to notify a human being remotely located from said device of the presence of said facsimile.

24. The system of claim 12 further including:

communication means for establishing telephonic communication over telephone circuitry with a human being remotely located relative to said device; and notification means responsive to the coded characters converted by said recognition means for activating said communication means to notify a human being remotely located from said device of the presence of said facsimile.

25. The system of claim 24 wherein the notification means includes speech means for aurally including at least some of the words of the spoken words obtained from converting the coded characters.

26. The device of claim 9 wherein the notification means includes speech means for aurally including at least some of the words of the spoken words obtained from converting the coded characters.

27. A device for converting a graphic image of textual material represented by a set of pixels where each pixel may be presented in a binary code into spoken words comprising:

computer data means for manipulating strings of data;

first storage means for storing a graphic image in binary form, at least some of said graphic image representing written words;

recognition means for assembly and processing at least portions of the stored graphic image into coded characters each character capable of being manipulated by the computer data means;

second storage means for storing recorded spoken words;

text-to-speech means for converting the groups of coded characters into spoken words; and, mixing means for serially mixing recorded spoken words with the spoken words obtained from converting groups of coded characters.

28. A computerized system for converting to spoken words a series of graphic images of textural material represented by a set of pixels, where each pixel represents the presence or absence of a shade of grey and wherein each pixel may be represented by a binary code, the computerized system comprising:

a processor including operating systems means for manipulating binary coded strings of data;

memory means responsive to the processor; for receiving storing and making available to the processor binary coded strings of date;

means for receiving binary representations of the series of graphic images at least some of said graphic images representing written words;

recognition means responsive to the processor for assembling and converting at least a portion of the received binary representations of said series of graphic images into coded characters capable of being manipulated by said processors;

text-to-speech means for converting groups of coded. characters into spoken words in a particular language;

input means for inputting textual matter in a character by character manner, each of said characters uniquely represented by a group of at least five binary digits;

text-to-graphic conversion means for converting groups of binary digits representing characters to strings of binary digits representing a graphic depiction of the inputed textual matter;

said means for receiving binary representations further including means for transmitting a graphic image to a remote site.

* * * * *

UNITED STATES PATENT AND TRADEMARK OFFICE
CERTIFICATE OF CORRECTION

PATENT NO. : 4,996,707
DATED : February 26, 1991
INVENTOR(S) : Sara O'Malley et al.

It is certified that error appears in the above-identified patent and that said Letters Patent is hereby corrected as shown below:

Column 2, line 42, after "includes the conversion" delete "to" and insert -- of --.

Column 5, line 56, delete "35" and insert -- 34 --, line 57, delete "34" and insert -- 35 --.

Column 10, line 39, delete "tile" and insert -- file --.

Column 12, line 42, delete "th" and insert -- the --.

Column 15, line 51, delete "upper" and insert -- user --.

UNITED STATES PATENT AND TRADEMARK OFFICE
CERTIFICATE OF CORRECTION

PATENT NO. : 4,996,707

DATED : February 26, 1991

INVENTOR(S) : Sara O'Malley et al

It is certified that error appears in the above-identified patent and that said Letters Patent is hereby corrected as shown below:

Claim 27, column 19, line 22, delete "presented" and insert -- represented --.

Signed and Sealed this

Fourteenth Day of July, 1992

Attest:

DOUGLAS B. COMER

*Attesting Officer*     *Acting Commissioner of Patents and Trademarks*